United States Patent Office 3,167,574
Patented Jan. 26, 1965

3,167,574
PROCESS FOR PRODUCING ALKYL ALKYL-
PHOSPHONOCHLORIDATES
Bernard B. Brown, Leland J. Lutz, Charles J. Smith, Jr., and Earl A. Weilmuenster, Niagara Falls, N.Y., assignors to Olin Mathieson Chemical Corporation, a corporation of Virginia
No Drawing. Filed Jan. 15, 1954, Ser. No. 404,373
1 Claim. (Cl. 260—461)

Our invention relates to a method for the preparation of certain monochloro compounds by phosgenation.

More particularly, our invention concerns a method in which certain phosphonates are used as a starting material and in which the following reaction takes place:

$$(RO)(R'O)P(O)(R'') + COCl_2 \rightarrow (Cl)(R'O)P(O)(R'') + RCl + CO_2$$

R, R' and R'' being alkyl radicals.

For various reasons, the carrying out of the aforementioned reaction to produce the monochloro compounds of the formula:

$$(Cl)(R'O)P(O)(R'')$$

at a rapid rate and in good yield based upon the amounts of reactants taken is difficult of attainment. One of those reasons is the tendency of the ester used as a starting material to overchlorinate to form dichloro compounds, which are not the desired products of the present invention. Dichloro compounds represent reactant loss and furthermore react with the starting ester, thereby reducing the amount of such ester in the reaction mixture available for conversion to the desired monochloro compound. Other reasons why it is difficult to carry out the desired reaction rapidly and in good yield are found in the tendency of the monochloro compound desired as a product to condense with itself, and also to react with the ester starting material to form an anhydride in accordance with the following equation:

$$(RO)(Cl)P(O)R'' + (RO)(R'O)P(O)R''$$
$$\rightarrow (RO)(R'')P(O)-O-(O)P(OR)(R'') + R'Cl$$

In accordance with our present invention, we have discovered that by the use of certain critical reaction conditions of moderate severity it is possible to convert in high yield and at a rapid rate a phosphonate of the formula:

$$(RO)(R'O)P(O)(R'')$$

to a compound of the formula:

$$(Cl)(R'O)P(O)(R'')$$

by reaction with phosgene, where R, R' and R'' are alkyl radicals. Thus, in accordance with our invention we react the phosphonate:

$$(RO)(R'O)P(O)(R'')$$

with from 1.0 to 1.3 molar amounts of phosgene at 55–85° C. and at a pressure of 50–500 p.s.i.g., thereby rapidly producing a high yield of the desired product with minimum formation of by-products.

The following test runs illustrate various embodiments which fall within the scope of our invention and which were performed at equilibrium pressure in the following manner to produce the compound:

$$(Cl)(i\text{-}PrO)P(O)(CH_3)$$

as a product from diisopropyl methane phosphonate of the formula:

$$(i\text{-}PrO)_2P(O)(CH_3)$$

50 grams of distilled diisopropyl methane phosphonate was charged to a 250 ml.-capacity stainless steel pressure vessel which was fitted with a 500 pound gauge graduated in 5 pound units. To the vessel and contents, chilled in a Dry Ice-acetone bath, was added 31.6 grams of liquid phosgene. The vessel was quickly sealed and placed into a heating unit maintained at about 10° C. above the desired reaction temperature. Stirring of the reaction mixture was started immediately after the reaction temperature was attained, about 10 minutes being necessary to reach temperatures of 80° C., and was continued for the duration of the run. The reaction vessel was quickly transferred from the heater to the Dry Ice-acetone bath, by way of an ice water bath, and cooled until the gauge pressure remained constant. After the carbon dioxide was vented, the contents of the vessel were degassed for 30–60 minutes at 50–55° C. and 25–35 mm. of mercury, and distilled at reduced pressure.

Table I below sets forth the operating data and results obtained in these tests:

Table I

| Experiment No. | 1 | 2 | 5 | 3 | 4 | 9 |
|---|---|---|---|---|---|---|
| Diisopropyl methane phosphonate, gm | 50 | 50 | 50 | 50 | 50 | 50 |
| Diisopropyl methane phosphonate, moles | 0.278 | 0.278 | 0.278 | 0.278 | 0.278 | 0.278 |
| Equilibrium Pressure, lbs./sq. in. gauge | 100–120 | 155–215 | 200–255 | 245–305 | 330–380 | 320–380 |
| Temp., °C | 29–31 | 50–55 | 55–60 | 69–76 | 82–90 | 96–109 |
| Total gm. Phosgene | 31.6 | 31.6 | 31.6 | 31.6 | 31.6 | 31.6 |
| Mole ratio, Phosgene/Diisopropyl methane phosphonate | 1.15 | 1.15 | 1.15 | 1.15 | 1.15 | 1.15 |
| Stirring time, min | 15 | 15 | 15 | 15 | 15 | 15 |
| Total reaction time, min | 27 | 23 | 27 | 20 | 21 | 19 |
| Degassing Period, Min | 45 | 45 | 45 | 45 | 45 | 45 |
| Wt. of degassed prod., gm | 44.2 | 42.7 | 40.0 | 41.4 | 41.8 | 35.9 |
| Distillation press., mm. Hg | 1.5–2.3 | 3.2–4.8 | 1.6–2.2 | 1.6–2.3 | 4.2–6.0 | 1.7–3.5 |
| Distillation vapor temp., °C | 46–52 | 47–54 | 41–43 | 41–45 | 49.5–57 | 34.5–43 |
| Wt. of distillate, gm | 34.2 | 26.8 | 29.1 | 37.0 | 37.0 | 23.0 |
| Wt. of residue, gm | 5.2 | 8.1 | 7.2 | 3.2 | 1.1 | 0.42 |
| Ratio residues/distillate | 0.152 | 0.310 | 0.248 | 0.087 | 0.030 | 0.42 |
| Hydrolyzable Cl in distillate | 14.90 | 18.70 | 20.10 | 21.17 | 22.98 | 23.37 |
| Percent Purity Product | 65.8 | 82.5 | 88.8 | 93.5 | 99 | 97.5 |
| Wt. of pure Product, gm | 22.5 | 22.2 | 25.8 | 34.6 | 36.6 | 22.4 |
| Wt. of pure Product, moles | 0.144 | 0.142 | 0.165 | 0.220 | 0.234 | 0.143 |
| Yield of Product based on Diisopropyl methane phosphonate, percent | 51.7 | 51.0 | 59.4 | 79.5 | 84.3 | 51.5 |

The data of Table I illustrate the importance of operating within the limits of the present invention in carrying out the reaction. Thus, it will be noted that when the reaction temperature of 30° C. was used the residue/distillate ratio was somewhat lower than when a reaction temperature of 50–55° C. was used. This is not to be expected, but can possibly be explained by the slow rate of anhydride formation at 30° C. When the reaction temperature was increased from 50–55° C. to 82–90° C. the residue/distillate ratio decreased with increased reaction temperature, but with reaction temperatures of 96–109° C. the residue/distillate ratio rose sharply due not only to increased anhydride formation but to condensation of dichloro by-product with diisopropyl methane phosphonate and of product with itself.

A further series of test runs was made using the procedure just described, with the exception that the pressure in the reaction vessel was maintained at 125 pounds per square inch gauge by venting the carbon dioxide. Since it was desired to maintain the bulk of the phosgene in the liquid state, the maximum temperature utilized was about 75° C. The operating data and results obtained in this series of runs are set forth in Table II below:

Table II

| Experiment No. | 61 | 63 | 67 | 73 | 75 |
|---|---|---|---|---|---|
| Diisopropyl methane phosphonate, gm. | 50 | 50 | 50 | 50 | 50 |
| Diisopropyl methane phosphonate, moles | 0.278 | 0.278 | 0.278 | 0.278 | 0.278 |
| Operating Pressure, lbs./sq. in. gauge | 125 | 125 | 125 | 125 | 125 |
| Temp., °C | 69-72 | 69-90 | 69-72 | 72-75 | 74-76 |
| Total gm. Phosgene | 33.1 | 33.1 | 33.1 | 33.1 | 33.1 |
| Mole ratio, Phosgene/Diisopropyl methane phosphonate | 1.2 | 1.2 | 1.2 | 1.2 | 1.2 |
| Stirring time, min | 15 | 20 | 20 | | |
| Total reaction time, min | 27 | 25 | 29 | 20 | 10 |
| Degassing Period, min | 45 | 45 | 45 | 45 | 45 |
| Wt. of degassed product, gm | 42.4 | | 41.3 | 42.1 | 42.2 |
| Distillation press., mm. Hg | 1.0-3.5 | 2.8-3.4 | 2.0-4.0 | 2.0-2.3 | 1.5-2.6 |
| Distillation vapor temp., °C | 26-50 | 48-51 | 41-52 | 52-56 | 50-51 |
| Wt. of distillate, gm | 38.2 | 38.9 | 38.2 | 38.0 | 38.8 |
| Wt. of residue, gm | 2.0 | 2.2 | 1.7 | 2.2 | 2.2 |
| Ratio, residues/distillate | 0.053 | 0.057 | 0.045 | 0.058 | 0.057 |
| Hydrolyzable Cl in distillate | 22.46 | 22.32 | 22.20 | 22.68 | 22.10 |
| Percent Purity Product | 99.0 | 98.5 | 98.0 | 100 | 98 |
| Wt. of pure Product, gm | 37.8 | 38.3 | 37.4 | 38 | 37.8 |
| Wt. of pure Product, moles | 0.242 | 0.245 | 0.239 | 0.244 | 0.242 |
| Yield of Product based on Diisopropyl methane phosphonate, percent | 87 | 88 | 86 | 88 | 87.5 |

Various modifications can be made in the specific procedures just described to provide other embodiments which fall within the broad scope of our invention. Thus, our invention is generally applicable in the preparation of compounds of the formula:

$$(Cl)(R'O)P(O)(R'')$$

by reacting compounds of the formula:

$$(RO)(R'O)P(O)(R'')$$

with phosgene under the conditions specified. In the two preceding formulas, R, R' and R'' are alkyl radicals, the sum of the carbon atoms in R and R' preferably not exceeding 8 and the number of carbon atoms in R'' preferably not exceeding 4. Thus, R and R' can be, for example, methyl, ethyl, n-propyl, n-butyl, 2-ethylhexyl and the like and R'' can be, for example, methyl, ethyl, n-propyl, i-propyl, n-butyl, i-butyl and the like.

We claim:

A method for the preparation of a compound of the formula:

$$(Cl)(R'O)P(O)(R'')$$

which comprises reacting a compound of the formula:

$$(RO)(R'O)P(O)(R'')$$

with from 1.0 to 1.3 molar amounts of phosgene at a temperature within the range 55–85° C. and a pressure within the range 50–500 p.s.i.g., R and R' being isopropyl radicals and R'' being a methyl radical.

No references cited.

CHARLES B. PARKER, *Primary Examiner.*

WILLIAM G. WILES, C. D. QUARFORTH, *Examiners.*